UNITED STATES PATENT OFFICE.

GEORGE E. FERGUSON, OF NEW YORK, N. Y., ASSIGNOR TO PYRENE MANUFACTURING COMPANY, A CORPORATION OF DELAWARE.

FIRE-EXTINGUISHING COMPOSITION HAVING A LOW FREEZING-POINT.

1,270,397.   Specification of Letters Patent.   Patented June 25, 1918.

No Drawing.   Application filed October 20, 1914.   Serial No. 867,587.

*To all whom it may concern:*

Be it known that I, GEORGE E. FERGUSON, a citizen of the United States, and resident of the city, county, and State of New York, have invented certain new and useful Improvements in Fire-Extinguishing Compositions Having a Low Freezing-Point, of which the following is a specification.

The object of this invention is to produce a compound having a low freezing point, or more specifically, to lower the normal freezing point of the basic element of the compound. Carbon tetrachlorid has been selected as illustrative of the basic element which, being a solvent for many other compounds, is useful for many purposes, among which carbon tetrachlorid may be mentioned, carbon tetra chlorid being non-inflammable.

The extensive uses to which carbon tetrachlorid is put, make it desirable to lower its normal freezing point (which in the chemically pure state is $-19.5°$ C.) to permit its use in temperatures where extreme cold weather prevails; that it may be utilized as a liquid and at the same time maintain all of its useful properties.

With this in mind, I have performed a large number of experiments to ascertain if some underlying principle can be made to govern this depression of the freezing point.

It is a well known fact that, considering inorganic compounds and the inorganic solvents, that the depression of the freezing point depends upon the solubility of the salts used and the degree of dissociation which takes place when these salts are dissolved in the solvent (which solvent in most cases, is water).

The laws governing the depression of the freezing point for "electrolytes" are simple:

1. The freezing point of a solution is lower than that of the pure solvent.

2. The depression of the freezing point is proportional to the concentration of the solution.

3. If "$t$" degrees be the depression produced by the presence of "$p$" grams of substance in 100 grams of the solvent, then the molecular depression $$C = \frac{t}{p} m$$

where "$m$" is the molecular weight of the dissolved substance).

These laws do not hold good in the depression of the freezing point of the carbon tetrachlorid. A good example of this is in the solution of a compound like azo benzene $(C_6H_5N_2C_6H_5)$ which is very soluble in carbon tetrachlorid. When this substance is added the result is a higher freezing point than that of the carbon tetrachlorid alone, and the more azo compound dissolved the higher freezing point.

When a number of such experiments were tried and no principle could be established, it was decided to try out all the "commercially possible" substances which could be dissolved in carbon tetrachlorid, to ascertain which would depress the freezing point. It was found that among the great variety of compounds tried out about 150 accomplished the desired result.

It is understood that some of these compounds would prove detrimental to the use of carbon tetrachlorid under certain conditions while they might prove very acceptable under others.

To simplify the list, it was thought best to classify these substances under different chemical groups, such as, (1) esters and ethers; (2) amins and amino compounds; (3) aldehydes and ketones; (4) alcohols; (5) oils; (6) hydrocarbons, substitutes and derivatives; (7) phenols and phenol derivatives; (8) terpenes, camphors and (9) acids, etc.

About the only generality which can be made in regard to all this investigation is the fact that most compounds which are in the liquid state at normal (room) temperatures and which are soluble in carbon tetrachlorid lower the freezing point of the carbon tetrachlorid, and vice versa, most of the compounds which are solid at normal temperatures and soluble in carbon tetrachlorid do not lower the freezing point but in most cases raise it. There are, however, enough exceptions to this generality to render it impossible of general application as a rule.

In this investigation no attempt was made to determine the quantity of substance dissolved in a known amount of solvent to produce an observed depression of the freezing point. It was thought that sufficient knowledge was gained in determining just what compounds would accomplish the desired depressing effect on the freezing point.

Considering the group of acids, the following may be taken as a definition:

By the term organic acid is meant the oxidation product of aldehydes and ketones. An organic acid, generally speaking, has the property of acting on organic bases (alcohols) to form esters.

The following may be taken as examples of this group:

Chloracetic acid, $ClCH_2COOH$; gynocardic acid, $C_{13}H_{21}COOH$; oleic acid, $CH_3(CH_2)_{13}CHCHCH_2COOH$; propionic acid, $CH_3CH_2COOH$; acetic acid, $CH_3COOH$.

It is obvious that it is impossible to cover every compound, in the manner described, to ascertain if the freezing point of carbon tetrachlorid could be lowered by dissolving the compound therein. I have, however, made tests in each class of compounds with commercially possible examples in each class. What future developments may be made toward the reduction of the cost of a number of the expensive compounds thus rendering the same "commercially possible" is problematical but my experiments and tests show that it is possible to generalize in these different classes or divisions.

Four hundred and thirty experiments were performed, the substances selected being taken from the chemical catalogues. All of the organic substances costing one dollar or less per ounce were tried—as it was considered that these compounds, from the standpoint of cost, would be commercially possible. It was found that a great many of these compounds were insoluble in carbon tetrachlorid and therefore eliminated themselves from the investigation.

What I claim is:

1. A fire extinguishing solution having a low freezing point comprising a carbon and chlorin compound and an organic acid dissolved therein.

2. A fire extinguishing solution having a low freezing point comprising carbon tetrachlorid and an organic acid dissolved therein.

3. A solution having a low freezing point comprising carbon tetrachlorid and propionic acid dissolved therein.

Signed at the city, county, and State of New York, this 8th day of October, 1914.

GEORGE E. FERGUSON.

Witnesses:
HAROLD W. CHAPMAN,
LEWIS J. DOOLITTLE.